United States Patent [19]
Suzuki et al.

[11] Patent Number: 5,519,467
[45] Date of Patent: May 21, 1996

[54] OPTICAL ISOLATOR DEVICE CAPABLE OF PREVENTING OPTICAL AXIS FROM INCLINING BY DEFORMATION OF ADHESIVE

[75] Inventors: Takayuki Suzuki; Toshiaki Masumoto, both of Tsukuba; Takashi Shibuya, Tokyo, all of Japan

[73] Assignees: Tokin Corporation, Miyagi; NEC Corporation, Tokyo, both of Japan

[21] Appl. No.: 208,649

[22] Filed: Mar. 9, 1994

[30] Foreign Application Priority Data

Mar. 10, 1993 [JP] Japan .................................. 5-049252

[51] Int. Cl.$^6$ .............................. G02B 5/30; G02B 27/28
[52] U.S. Cl. .................... 359/484; 359/281; 372/703
[58] Field of Search .................................. 359/281, 282, 359/283, 484; 372/703

[56] References Cited

U.S. PATENT DOCUMENTS

| | | | |
|---|---|---|---|
| 5,161,049 | 11/1992 | Tanno et al. | 359/484 |
| 5,305,137 | 4/1994 | Ohkawara . | |
| 5,315,431 | 5/1994 | Masuda et al. | 359/495 |
| 5,341,235 | 8/1994 | Watanabe et al. | 359/484 |

FOREIGN PATENT DOCUMENTS

| | | | |
|---|---|---|---|
| 0512575A2 | 11/1992 | European Pat. Off. . | |
| 62-73227 | 4/1987 | Japan | 359/484 |
| 63-15216 | 1/1988 | Japan | 359/484 |
| 63-123014 | 5/1988 | Japan | 359/484 |
| 63-144301 | 6/1988 | Japan | 359/484 |
| 1-200223 | 8/1989 | Japan | 359/484 |
| 2-201417 | 8/1990 | Japan . | |
| 4-50916 | 2/1992 | Japan | 359/484 |
| 4-93814 | 3/1992 | Japan . | |
| 4-93813 | 3/1992 | Japan . | |

*Primary Examiner*—Martin Lerner
*Attorney, Agent, or Firm*—Frishauf, Holtz, Goodman, Langer & Chick

[57] ABSTRACT

An optical isolator device comprises a magnet having a rectangular channel and a rectangular optical isolator element fitted in the channel and fixed to the magnet by adhesive filled up in a gap around the element in the channel. In order to avoid an increased thickness of the adhesive layer which is caused by round corners of the rectangular channel in production of the magnet by injection molding, the magnet is formed with a small slit outwardly extending from each corner of the rectangular channel. Thus, the optical isolator element is fitted in the channel without interference of the channel corners and is in close contact with at least one of flat inner surfaces of the channel to form a thin gap of 10 microns or less therebetween. Accordingly, the optical isolator element is strongly adhered to the inner surface of the channel by the thin adhesive layer of 10 microns or less in the thin gap. In another approach, each of corners of the channel in the magnet is round, but the optical isolator element is partially and obliquely cut away to form a facet at each of the corners of the rectangular shape thereof.

8 Claims, 4 Drawing Sheets

OPTICAL ISOLATOR DEVICE CAPABLE OF PREVENTING OPTICAL AXIS FROM INCLINING BY DEFORMATION OF ADHESIVE

BACKGROUND OF THE INVENTION

This invention relates to an optical isolator device having an optical axis for permitting an incident light beam in a direction along the optical axis to pass therethrough and for preventing another incident light beam in the opposite direction from passing therethrough.

As is well known in the art, an optical isolator device is used in, for example, a laser diode (LD) module which comprises a semiconductor laser diode and an optical fiber. The optical isolator device is disposed between the semiconductor laser diode and the optical fiber. An optical axis of the optical isolator device is coincident with an optical axis of the semiconductor laser diode and an optical axis of the optical fiber without offset. The semiconductor laser diode emits a light beam which is incident as an incident light beam onto an incident end of the optical isolator device. The optical isolator device permits the incident light beam to pass therethrough. Accordingly, the incident light beam emits from an outgoing end of the optical isolator device as an outgoing light beam which is, in turn, incident onto an incident end of the optical fiber. A part of the outgoing light beam is reflected on the incident end of the optical fiber as a reflected light beam. The remainder of the outgoing light beam is transmitted through the optical fiber as a transmitting light beam. A ratio of intensity of the transmitting light beam to intensity of the outgoing light beam is called a coupling coefficient. The reflected light beam is returned as a return light beam to the outgoing end of the optical isolator device in the opposite direction of the outgoing light beam. The optical isolator device prevents the return light beam from passing therethrough in the opposite direction, Therefore, the reflected light beam is cut off by the optical isolator device to inhibit the semiconductor laser diode from receiving the reflected light beam. As a result, it is possible to make the semiconductor laser diode operate stably without appearance of noise.

A conventional optical isolator device comprises a magnet having a rectangular channel which has an inner surface and a first central axis. An optical isolator element is a body with a rectangular section and has an outer surface and a second central axis as an optical axis. The rectangular optical isolator element is fitted and fixed in the rectangular channel by adhesive filled up in a gap around the optical isolator element and between the outer surface of the optical isolator element and the inner surface of the rectangular channel in a condition that the first central axis and the second central axis are parallel without offset.

From the reason in production of the magnet, the rectangular channel is formed round at the four corners, for example, with about 0.1 mm radius of curvature. On the other hand, the rectangular optical isolator element can be formed with a clean and sharp corners by use of a dicing saw. Therefore, the rectangular channel is formed slightly larger, for example, by 0.1 mm than the optical isolator element. As a result, the thickness of the adhesive filled up in the gap is disadvantageously large from the view point of the adhering intensity of the adhesive. Therefore, when the adhesive in the gap is exposed in an environment of a high temperature and/or a high humidity and is deformed thereby, the optical isolator device is defective in that the second central axis inclines against the first central axis by the deformation of the adhesive. The inclination causes a deterioration of a coupling coefficient between the optical isolator device and an optical fiber in an LD module.

SUMMARY OF THE INVENTION

It is therefore an object of this invention to provide an optical isolator device which is capable of holding its optical axis stably without inclination caused by deformation of an adhesive exposed to a high temperature and/or a high humidity.

Other objects of this invention will become clear as the description proceeds.

This invention is applicable to an optical isolator device having an optical axis permitting an incident light beam in a direction along the optical axis to pass therethrough and for preventing another incident light beam in the opposite direction from passing therethrough. The optical isolator device comprises a magnet having a rectangular channel extending between opposite ends of the magnet along a first central axis, the rectangular channel being defined by four flat inner surfaces parallel to the first central axis and having a first rectangular section, an optical isolator element having a second central axis and a rectangular shape similar to the rectangular channel to thereby have four flat outer surfaces parallel to the second central axis, the optical isolator element being fitted in the rectangular channel of the magnet so that the four flat inner surfaces face the four flat outer surfaces, respectively, to leave four gap portions therebetween, the four gap portions being connected together to form the endless gap, one of the flat inner surfaces being in close contact to the corresponding one of the flat outer surfaces to make a particular one of the gap portions therebetween 10 microns or less, and adhesive filled up in the endless gap to fix the optical isolator element to the magnet, the optical isolator element being strongly adhered to the magnet by an adhesive layer of 10 microns or less in the particular gap portion.

According to an aspect of this invention, the optical isolator element has clean and sharp edges at four corners of the rectangle shape, and the magnet is formed with four small slits at four corners of the rectangular channel to outwardly extend from the channel.

According to another aspect of this invention, the rectangular channel of the magnet is formed round with a small radius of curvature at four corners thereof, and the optical isolator element is partially and obliquely cut away to form a facet at each of four corners of the rectangular shape.

DESCRIPTION OF THE PREFERRED EMBODIMENT

Figure 1:
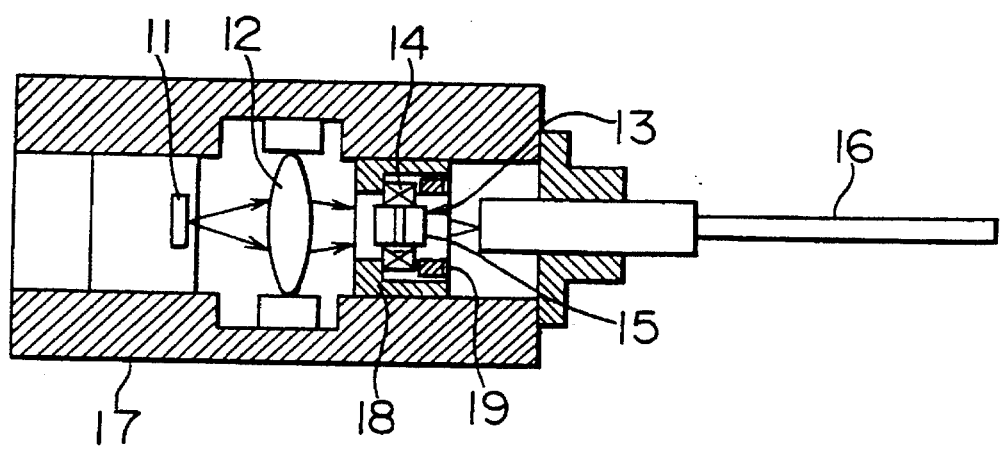
FIG. 1 is a sectional view illustrating a known LD module.
Figure 2:
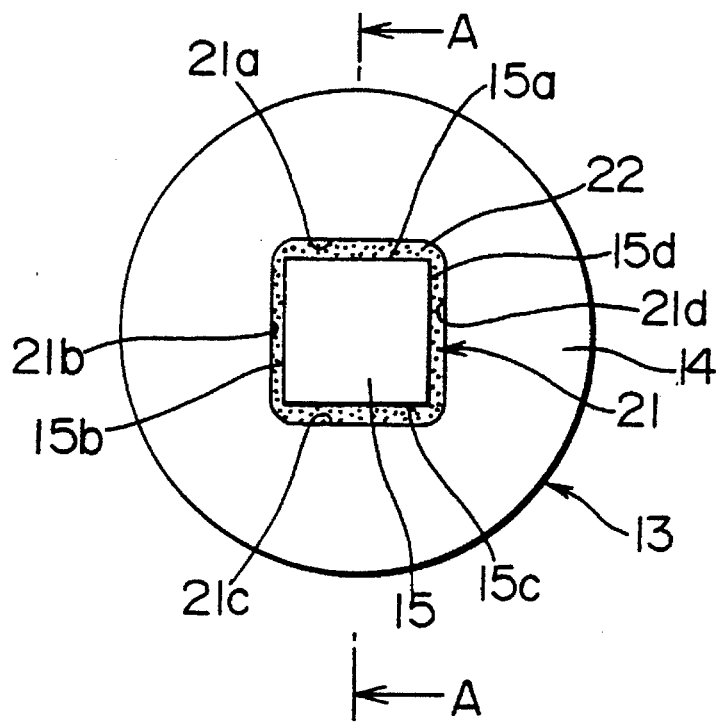
FIG. 2 is a front view illustrating a known optical isolator device used in the LD module of FIG. 1.
Figure 3:
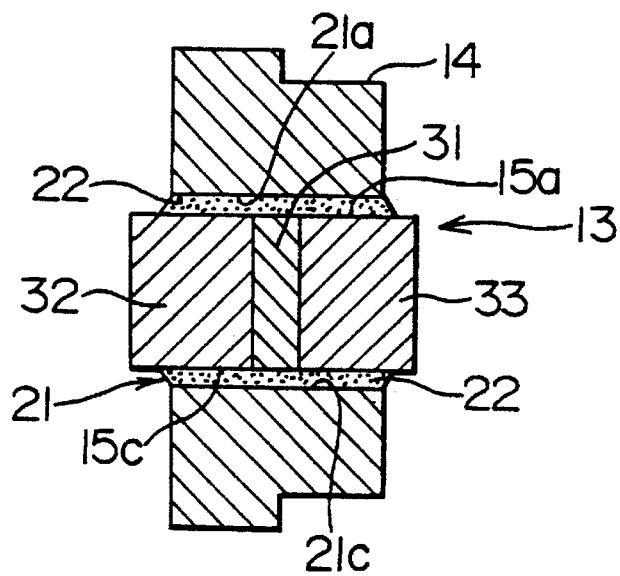
FIG. 3 is a sectional view taken along a line A—A in FIG. 2.

Referring to FIGS. 1, 2, and 3, a conventional optical isolator device will first be described in order to facilitate understanding of the present invention.

In FIG. 1, an LD module comprises a semiconductor laser diode 11, an optical lens 12, and an optical isolator device 13 arranged and disposed in this order on an optical axis. The semiconductor laser diode 11 is for emitting a light beam. The optical lens 12 is for condensing the light beam to produce a condensed light beam. The optical isolator device 13 has a magnet 14 and an optical isolator element 15 for permitting the condensed light beam to pass therethrough but for preventing another light beam in a direction opposite to the condensed light beam from passing therethrough. The LD module is also provided with an optical fiber 16 which has a core of ten microns in diameter for transmitting the condensed light beam supplied from the optical isolator device 13. A holder 17 supports and holds the semiconductor laser diode 11, the optical lens 12, and the optical fiber 16. Housings 18 and 19 fix the magnet 14 to the holder 17.

Referring to FIGS. 2 and 3, the conventional optical isolator device 13 comprises the magnet 14 having a rectangular channel 21 extending from one end to the opposite end of the magnet. The rectangular channel 21 has a first central axis and is defined by four flat inner surfaces $21a$–$21d$ parallel to the first central axis. That is, the rectangular channel 21 has a first rectangular section.

The optical isolator element 15 has a second central axis and is defined to be rectangular by four flat outer surfaces $15a$–$15d$ parallel to the second central axis. That is, the optical isolator element 15 has a second rectangular section. The optical isolator element 15 is smaller than the rectangular channel 21 and is fitted and fixed in the channel 21 by adhesive 22, typically epoxy optical adhesive, in a condition such that the first central axis and the second central axis are coincident with each other. The adhesive is filled up in an endless gap between the four flat inner surfaces $21a$–$21d$ of the channel 21 and the four flat outer surfaces $15a$–$15d$ of the optical isolator element 15.

The optical isolator element 15 comprises a Faraday rotator 31 such as a garnet, a polarizer 32, and an analyzer 33. The polarizer 32 and the analyzer 33 are disposed and stacked on opposite sides of the Faraday rotator 31, respectively.

Typically, the optical isolator element 15 is produced by the following steps. The polarizer plate and the analyzer plate are fixed onto the opposite side surfaces of Faraday rotator garnet crystal by use of optical adhesive to form a stack. The size of those polarizer and analyzer plates is, for example, 11.0 mm×11.0 mm and has a thickness up to 1 mm. The garnet crystal has a size of, for example, 11.0 mm×11.0 mm and a thickness up to 0.5 mm. The optical isolator element 15 of, for example, 1.5 mm×1.5 mm with a thickness up to 2.5 mm, is cut out from the stack by use of a dicing saw. Accordingly, the rectangular isolator element has sharp or clean edges at four corners of the rectangle.

On the other hand, the magnet 14 is typically formed by the injection molding to a predetermined shape having, for example, an outer diameter of 4 mm, a thickness of 2 mm and the rectangular channel size of 1.5 mm×1.5 mm.

By the reason of the dimensional accuracy of a mold used in the injection molding, four corners of the rectangular channel 21 are unavoidably formed not clean but round with about 0.1 mm radius of curvature, as shown in FIG. 2.

It will be understood from this that the rectangular optical isolator element 15 of 1.5 mm×1.5 mm cannot be filled into the channel 15 having the same size but round corners, because the round corners interfere with the edges of the optical isolator element 15. Accordingly, the rectangular channel 15 is formed with a size slightly larger, for example, by 0.1 mm than the optical isolator element 15. As a result, the optical isolator element 15 can be fitted into the rectangular channel 21 but there are gaps of 0.05 mm at minimum left between the flat inner surfaces $21a$–$21d$ of the rectangular channel 21 and the corresponding flat outer surfaces $15a$–$15d$ of the optical isolator element 15. In the gap, the adhesive 22 is filled up to fix the optical isolator element 15 in the channel 21.

Generally, it is known in the prior art that the adhesive is necessarily thin, in detail, 10 microns or less in thickness in order to provide sufficient fixing or adhering intensity. Further, it is also known that the adhesive deforms when exposed in an environment of a high temperature and/or a high humidity.

Accordingly, during use of the optical isolator element 15, the thick adhesive 22 may unfortunately be deformed by a high temperature and a high percentage of humidity. This deformation inclines the optical isolator element 15 in the magnet 14 because the adhering intensity of the thick adhesive 22 is not sufficient.

If the adhesive 22 has uniform thickness along the first central axis and the deformation is made uniformly over the entire portions of the adhesive 22, the second central axis may not be inclined by the deformation of the adhesive 22. However, it is difficult to make the thickness of the adhesive 22 uniform, and the deformation of the adhesive 22 is not always caused uniformly over the entire portions of the adhesive 22. Further, the optical isolator element 15 is under the influence of gravity. Therefore, even when the adhesive 22 is slightly deformed, the second central axis of the optical isolator element 15 results in a slight inclination against the first central axis of the channel 21 in the magnet 14. Even if the slight inclination is an angle of 0.1 degree, the optical axis of the optical isolator element 15 is offset from the optical axis of the optical fiber 16 in the LD module of FIG. 1. As a result, the coupling between the optical isolator device 15 and the optical fiber 16 deteriorates greatly, because the light beam emitted by the semiconductor laser 11 is a Gaussian beam. For example, the coupling coefficient deteriorates by 2 dB under a condition that temperature is 85 degrees Centigrade and humidity is 80% RH.

Figure 4:
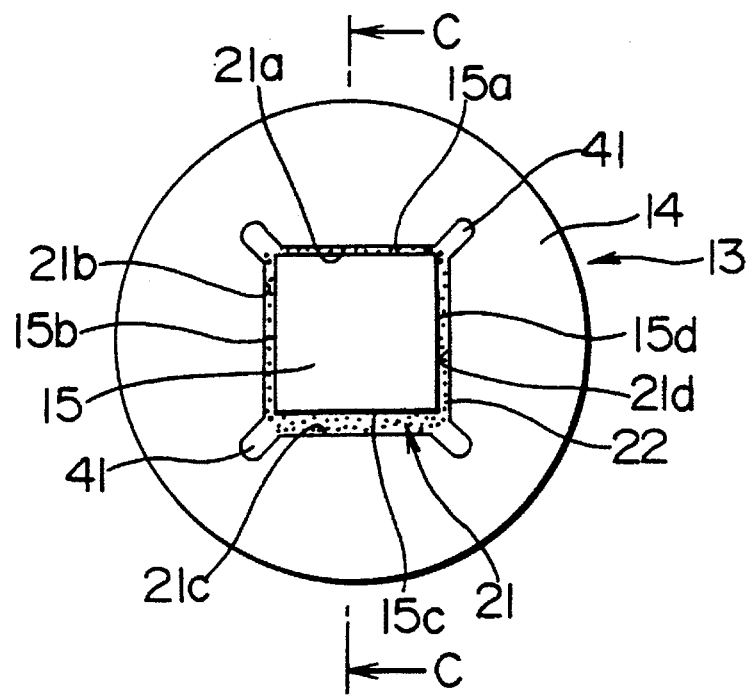
FIG. 4 is a front view illustrating an optical isolator device according to an embodiment of this invention.
Figure 5:
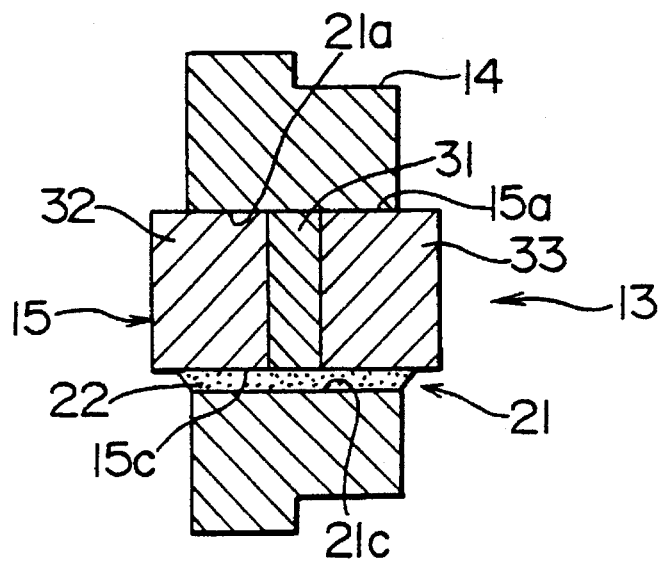
FIG. 5 is a sectional view taken along a line C—C in FIG. 4.

Referring to FIGS. 4 and 5, the description will proceed to an optical isolator device according to a first embodiment of this invention. Similar parts are designated by like reference numerals.

In FIGS. 4 and 5, the magnet 14 is also formed with the rectangular channel 21 similar to the conventional one but is characterized by provision of four small slits or reliefs 41 at four corners of the rectangular channel 21. The small slits 41 outwardly extend from the channel 21.

The optical isolator element 15 is fitted in the channel 22. The four flat inner surfaces $21a$–$21d$ face the four flat outer surfaces $15a$–$15d$, respectively, to leave four gap portions therebetween. The four gap portions are connected together to form an endless gap communicating with the four small slits. The adhesive 22 is filled up in the endless gap. The optical isolator element 15 receives a magnetic field from the magnet 14 and is thereby attracted toward one of flat inner surfaces $21a$–$21d$ of the channel 21. Therefore, the first central axis of the channel 21 and the second central axis of the optical isolator element 15 are parallel but offset from each other. The one of flat inner surfaces 21a–21d is close to the corresponding one of outer surfaces 15a–15d so that one of the gap portions therebetween can be 10 microns or less and smaller than at least two of the other three gap portions. Since the one of outer flat surfaces 15a–15d adheres to the one of inner flat surfaces 21a–21d with an adhesive layer of 10 microns or less, the isolator element 15 is strongly fixed to the magnet 14. Therefore, even if the optical isolator device 13 is put in an environment of a high temperature and/or a high humidity for a long time to deform the adhesive, the optical isolator element 15 is not inclined in the magnet 14. Accordingly, the coupling coefficient can be maintained constant in the LD module having the optical isolator device 13 of FIG. 5.

As an example, the magnet 14 was formed by the injection molding and had a size of 3.9 mm in outer diameter and 2 mm in thickness, with the rectangular channel 22 of 1.5 mm×1.5 mm and four small slots 41 at four corners of the rectangular channel. The magnet 14 was a ferritic plastic magnet and had a central magnetic flux density of $3\times10^{-2}$ T (tesla) or more.

Into the channel of the magnet, the optical isolator element 15 of 1.5 mm×1.5 mm was fitted which was cut out from the stack by the dicing saw as described in connection with FIGS. 2 and 3. The optical isolator element 15 could be inserted into the channel without its four corners interfering with the corners of the rectangular channel and was fixed to the inner surface of the channel by the adhesive to form an optical isolator device 13. The optical isolator device was assembled in an LD module as shown in FIG. 1 and put, as a test, in an environment of a high temperature 85° C. and a high humidity 80% RH for a long time. Before and after the test, the coupling coefficient of the LD module was measured. It was confirmed that the coupling coefficient was not lowered by the test.

Figure 6:
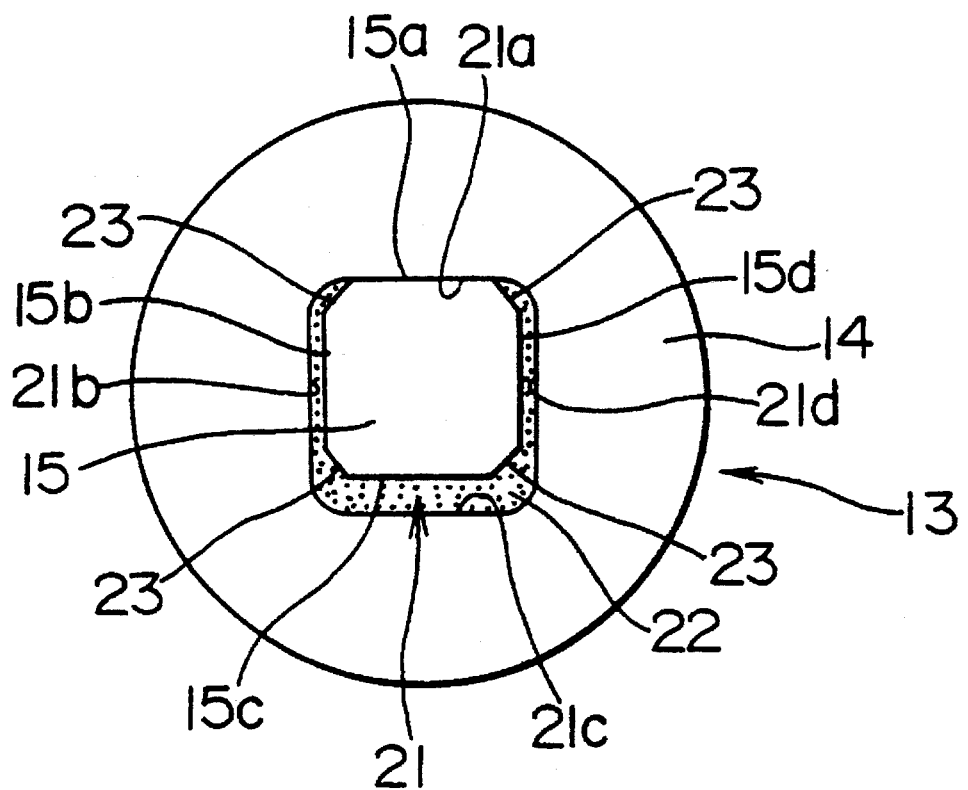
FIG. 6 is a front view illustrating an optical isolator device according to another embodiment of this invention.

Referring to FIG. 6, the description will proceed to an optical isolator device according to a second embodiment of this invention. Similar parts are designated by like reference numerals.

The optical isolator element 15 is generally rectangular but is obliquely cut away at four corners to form a facet shown by 23 at each corner. The facet is about $0.1\times\sqrt{2}$ millimeters wide. The optical isolator element 15 is fitted in the rectangular channel 22 with round corners of the magnet 14 without interference with the round corners. The four flat inner surfaces 15a–15d of the channel 15 face the four flat outer surfaces 15a–15d of the optical isolator element 15, respectively, to leave four gap portions therebetween. The four gap portions are connected together to form an endless gap around the optical isolator element 15. The adhesive 22 is filled up in the endless gap. The optical isolator element 15 receives a magnetic field from the magnet 14 and is attracted toward the one of flat inner surfaces. The one of flat inner surfaces 21a–21d is close to the corresponding one of outer surfaces 15a–15d, so that the gap portion therebetween is 10 microns or less and smaller than at least two of the other three gap portions. This is because the corners of the optical isolator element 15 do not run against the corners of the channel 22. The first central axis of the channel 21 and the second central axis of the optical isolator element 15 are parallel but offset from each other.

Therefore, it is noted that the one of the outer flat surfaces 15a–15d adheres to the corresponding one of the inner flat surfaces 21a–21d with an adhesive layer of 10 microns or less. As a result, the optical isolator element 15 is strongly fixed to the magnet 14. Therefore, the optical isolator element 15 can be stationarily maintained in the channel 21 of the magnet 14 without inclination caused by deformation of the adhesive exposed in a high temperature and a high humidity.

As another example, an optical isolator element of 1.5 mm×1.5 mm was cut out in the similar manner as in the previous example. The optical isolator element was cut away at each corner to form the facet of a $0.1\times\sqrt{2}$ mm width. On the other hand, a magnet was formed by the injection molding and had an outer diameter of 3.9 mm and a thickness of 2 mm, with the rectangular channel of 1.5 mm×1.5 mm. The channel had four round corners of 0.1 mm radius of curvature. The optical isolator would be fitted into the channel in the magnet without interference of the round corners. Then, the optical isolator element was fixed to the magnet by the adhesive to form an optical isolator device. The optical isolator device was assembled in an LD module as shown in FIG. 1 and subjected to a test similar to that in the previous example. As a result, it was confirmed that the LD module was not lowered in the coupling coefficient even after test.

According to the invention, it will be understood from the above description that the optical isolator element can be fitted in the channel in the magnet and strongly fixed to the magnet by the adhesive layer of 10 microns or less, without making the optical isolator element in a considerably small size in comparison with the channel in the magnet and without making the channel in a considerably large size in comparison with the optical isolator element.

What is claimed is:

1. An optical isolator device having an optical axis for permitting an incident light beam in a direction along said optical axis to pass therethrough and for preventing another incident light beam in an opposite direction from passing therethrough, said optical isolator device comprising:

a magnet having a rectangular channel which extends between opposite ends of said magnet along a first central axis and having four small slits at respective four corners of said rectangular channel, said rectangular channel being defined by four flat inner surfaces parallel to said first central axis and having a first rectangular section, said four small slits being arranged so as to outwardly extend from said rectangular channel;

an optical isolator element having a second central axis and a rectangular shape similar to that of said rectangular channel, said optical isolator element having four flat outer surfaces parallel to said second central axis and having clean and sharp edges at four corners of the rectangular shape thereof, said optical isolator element being fitted in said rectangular channel of said magnet so that said four flat inner surfaces of said magnet face said four flat outer surfaces, respectively, of said optical isolator element, so as to leave four gap portions therebetween, said four gap portions being connected together to form an endless gap, one of said flat inner surfaces being in close contact with a corresponding one of said flat outer surfaces such that a particular one of said gap portions therebetween is no more than 10 microns; and an organic adhesive filled in said endless gap to fix said optical isolator element to said magnet, said optical isolator element being strongly adhered to said magnet by an organic adhesive layer of no more than 10 microns in said particular one of said gap portions.

2. An optical isolator device as claimed in claim 1, wherein said optical isolator element is an assembled and stacked body which comprises a Faraday rotator, an analyzer, and a polarizer, said analyzer and said polarizer being disposed on and fixed to opposite sides of said Faraday rotator, respectively.

3. An optical isolator device as claimed in claim 2, wherein said organic adhesive is an epoxy optical adhesive.

4. An optical isolator device as claimed in claim 1, wherein said organic adhesive is an epoxy optical adhesive.

5. An optical isolator device having an optical axis for permitting an incident light beam in a direction along said optical axis to pass therethrough and for preventing another incident light beam in an opposite direction from passing therethrough, said optical isolator device comprising:

- a magnet having a rectangular channel which extends between opposite ends of said magnet along a first central axis, said rectangular channel being defined by four flat inner surfaces and having four round corners with a small radius of a curvature at said four round corners thereof, said four flat inner surfaces being parallel to said first central axis and having a first rectangular section;

- an optical isolator element having a second central axis and a rectangular shape similar to that of said rectangular channel, said optical isolator element having four flat outer surfaces parallel to said second central axis, said optical isolator element being partially and obliquely cut away to form a facet at each of four corners of said rectangular shape thereof, said optical isolator element being fitted in said rectangular channel of said magnet so that said four flat inner surfaces of said magnet face said four flat outer surfaces, respectively, of said optical isolator element, so as to leave four gap portions therebetween, said four gap portions being connected together to form an endless gap, one of said flat inner surfaces being in close contact with a corresponding one of said flat outer surfaces such that a particular one of said gap portions therebetween is no more than 10 microns; and

- an organic adhesive filled in said endless gap to fix said optical isolator element to said magnet, said optical isolator element being strongly adhered to said magnet by an organic adhesive layer of no more than 10 microns in said particular one of said gap portions.

6. An optical isolator device a claimed in claim 5, wherein said optical isolator element is an assembled and stacked body which comprises a Faraday rotator, an analyzer, and a polarizer, said analyzer and said polarizer being disposed on and fixed to opposite sides of said Faraday rotator, respectively.

7. An optical isolator device as claimed in claim 6, wherein said organic adhesive is an epoxy optical adhesive.

8. An optical isolator device as claimed in claim 5, wherein said organic adhesive is an epoxy optical adhesive.

* * * * *